Nov. 26, 1940.  B. ITZCOVITZ ET AL  2,222,950
ASSIST STRAP FOR VEHICLES
Filed June 7, 1940  2 Sheets-Sheet 1
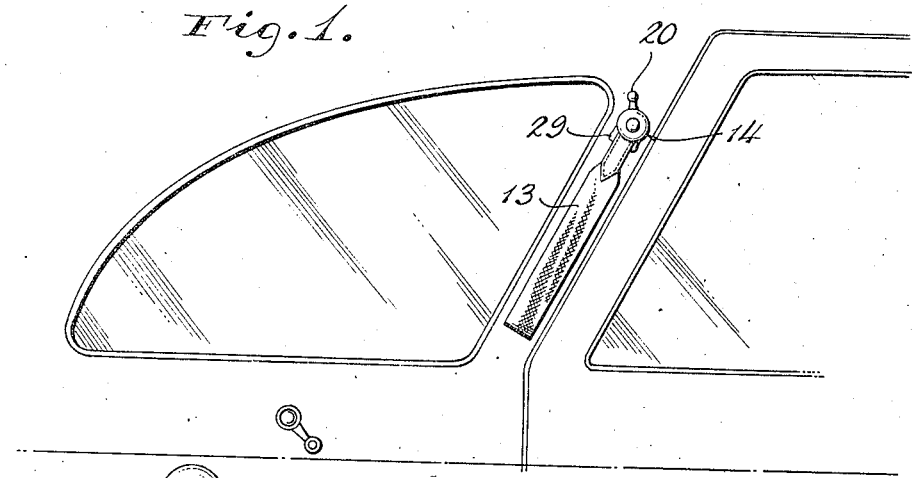
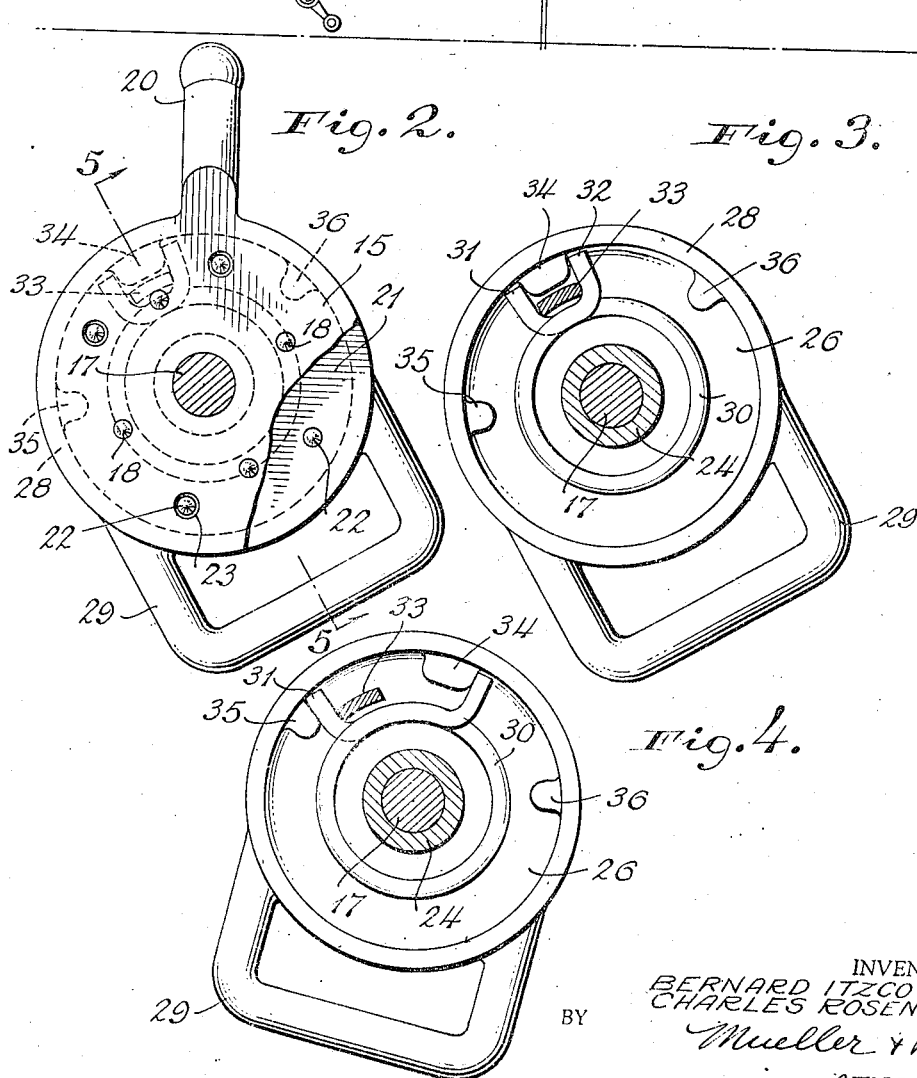
INVENTORS
BERNARD ITZCOVITZ
CHARLES ROSENBLUM
BY Mueller & Ruhl
ATTORNEYS Nov. 26, 1940.  B. ITZCOVITZ ET AL  2,222,950
ASSIST STRAP FOR VEHICLES
Filed June 7, 1940  2 Sheets-Sheet 2
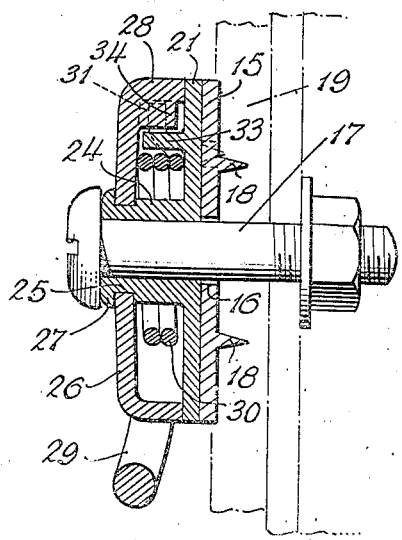
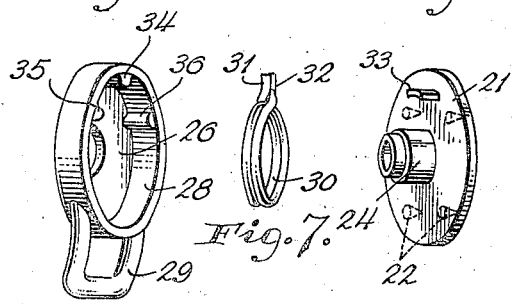
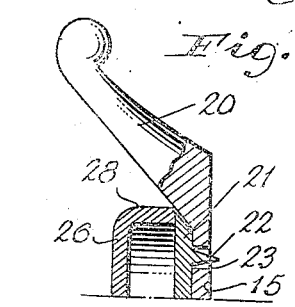
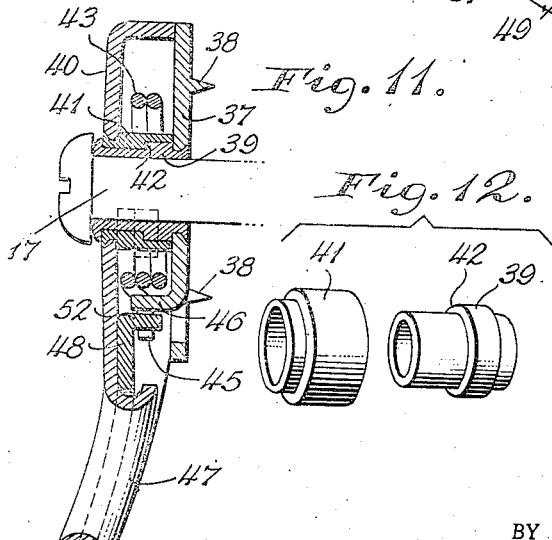
INVENTORS
BERNARD ITZCOVITZ
CHARLES ROSENBLUM
BY Mueller + Ruhl
ATTORNEYS Patented Nov. 26, 1940

2,222,950

UNITED STATES PATENT OFFICE 2,222,950

ASSIST STRAP FOR VEHICLES

Bernard Itzcovitz, Brooklyn, N. Y., and Charles Rosenblum, Newark, N. J., assignors to Harry Rubin, New York, N. Y.

Application June 7, 1940, Serial No. 339,270

14 Claims. (Cl. 105—354)

This invention relates to improvements in accessories for vehicles and has particular reference to a mounting for what are commonly known as assist or coach straps.

An object of the invention is to provide an improved strap mounting of simple and practical construction wherein a strap is yieldably maintained in a normal position from which it can be swung in either direction and returned to said position, when released.

Another object of the invention resides in connecting a strap to a turnable supporting member which, together with a stationary base plate, is provided with cooperating means to place a spring under tension, when said strap and supporting member are turned in either direction from a normal position, so that said spring will restore the strap to said position, and in which the spring and stop members coact to limit the swinging movements of said strap in either direction from said normal position.

The above and other objects will appear more clearly from the following detailed description when taken in connection with the accompanying drawings which illustrate preferred embodiments of the inventive idea.

In the drawings:

Figure 1 is a fragmentary interior view of a vehicle showing an assist strap mounted in its normal position.

Figure 2 is an enlarged rear elevation, partly broken away and shown in section, of the strap mounting constructed in accordance with one form of the invention.

Figure 3 is a view similar to Figure 2, with the base plate of the mounting removed and parts thereof shown in section.

Figure 4 is a view similar to Figure 3 showing parts of the mounting in an operated position in which the strap-supporting head of said mounting is turned or swung in a rearward direction, as viewed in Figure 1.

Figure 5 is a section on the line 5—5 of Figure 2.

Figure 6 is a perspective view of the strap-supporting head of the mounting.

Figure 7 is a similar view of a coiled spring employed to yieldably maintain said head in its normal position and restore the same to such position after it has been turned in either direction.

Figure 8 is a perspective view of a stationary base plate forming part of the mounting.

Figure 9 is a sectional view of a portion of the mounting and of a garment hanger forming a part thereof.

Figure 10 is a rear elevation, partly broken away and shown in section, of another form of mounting constructed in accordance with the present invention.

Figure 11 is a section on the line 11—11 of Figure 10, and

Figure 12 is a perspective view of the two parts of a bushing used in the embodiments of Figures 10 and 11.

Referring specifically to Figures 1 to 9 of the drawings, the invention is shown as comprising an assist or coach strap 13 carried by a mounting, generally indicated by the numeral 14, which is designed to be secured at a convenient point in a vehicle so as to aid a passenger entering into and exiting from such vehicle. In the embodiment being described, the mounting 14 comprises an anchoring plate 15 provided with a central aperture 16 for the passage of a bolt 17 therethrough utilized to secure the mounting to the frame of the vehicle. Said plate 15 is further provided with a series of prongs 18 adapted to be embedded in the upholstery 19 of the vehicle when the mounting is in position so as to aid in preventing any shifting of the anchoring plate. The plate 15 may also be provided in its upper portion with an outwardly inclined hook 20 from which garments may be suspended.

A second, stationary base plate 21 abuts the outer surface of the anchoring plate 15 and is also provided with a series of prongs 22 which extend through openings 23 in the plate 15 so as to prevent any shifting of said plate 21 relative to the anchoring plate. Centrally of the plate 21 the same is provided with a laterally extending bushing 24 which is reduced at 25 adjacent its outer end to form a bearing for the turnable strap-supporting head 26, the outer extremity of said bushing being flanged over as indicated at 27 to prevent endwise movement of the head 26 on said bushing. The interior diameter of the bushing 24 is the same as the diameter of the bolt 17 and forms a bearing for the latter so as to avoid any looseness in the parts which might otherwise cause rattling thereof when a vehicle is in motion or the strap 13 is being used. The head 26 is provided with a peripheral flange 28 which bears against the base plate 21 and combines therewith to form a housing in which is enclosed the elements for yieldably maintaining the strap 13 in its normal position and restoring it to such position after being turned in either direction therefrom. The head 26 is further provided with a depending loop 29 to which the strap 13 is connected.

The means for yieldably maintaining the strap 13 in its normal position and restoring the same to said position after it has been turned, comprises a coil spring 30 enclosed within the housing formed by the plate 21 and head 26 and encircling the bushing 24. The free extremities 31 and 32 of the spring 30 extend laterally from the coil thereof in spaced relation, as best shown in Figures 2 and 3. A spring holding member in the form of a lug 33 extends laterally from the inner face of the base plate 21 into the space between the spring extremities 31 and 32 and is designed to contact and hold either of said extremities against movement while the other extremity is moved away from the first named extremity during a partial rotation of the head 26. In order to accomplish the movement of either extremity of the spring relative to the other, there is cast upon the inner surface of the flange 28 of said head 26 a spring actuating member in the form of a lug 34 which is also engageable between the spring extremities 31 and 32. Thus, by reference to Figures 3 and 4, it will be seen that when the strap 13 is pulled to the left or in a clock-wise direction toward the position of Figure 4, the stationary holding member 33 will prevent movement of the spring extremity 31 while the member 34 on the head 26 will move the spring extremity 32 to the right and thus place said spring under tension. Said spring will be likewise tensioned by a movement of the head 26 in a reverse direction, in which event the extremity 32 will be held stationary and the extremity 31 will be turned in a counter clock-wise direction. In either circumstance, when the strap 13 is released the coil spring 30 will expand to restore the parts to the position of Figure 3.

It is desirable to prevent any excessive turning movement of the head 26 which might result in the breaking of the spring 30 and, to this end, stop members in the form of lugs 35 and 36 are cast upon the interior surface of the flange 28 equi-distantly on opposite sides of the lug 34. As shown in Figure 4, a turning movement of the head 26 in a clock-wise direction brings the lug 35 into contact with the extremity 31 of the spring and thus limits any further turning movement of said head. Likewise, in a reversed turning movement of said head 26 the lug 36 will contact the held extremity 32 of the spring to limit such turning movement.

Referring now to Figures 10 to 12, the mounting is shown as comprising a base plate 37 having a series of prongs 38 extending from the rear face thereof and adapted to be embedded in the upholstery 19 in the manner of the prongs 18. The plate 37 is centrally apertured to receive one end of the inner section 39 of a bushing which end is swaged or otherwise secured in the aperture of said plate. The turnable, flanged strap-supporting head 40, like the head 26, combines with the base plate 37 to form a housing, and in the central aperture of said head 40 there is secured one end of the outer section 41 of said bushing which has a bearing on the bushing section 39 and turns thereon when the head 40 is turned. Intermediate the ends of sections 39, 41, the same are stepped, as indicated at 42, to reduce to a minimum any possible rattling of the parts. A coil spring 43, similar to the spring 30, is disposed within the housing formed by the plate 37 and head 40 in encircling relation to the above-mentioned bushing. In the present embodiment the extremities 44 and 45 of the spring are disposed in a position substantially diametrically opposite to that shown in the first described embodiment. Struck from the plate 37 is a holding lug 46 which extends laterally from the plate and between the spring extremities, acting in the same manner as the lug 33. Counter-sunk within the head 40 and the strap loop 47 thereof is a stamping 48 in the form of a flat plate having the two arms 49 which extend about the inner periphery of the flange of the head 40 and terminate in stop lugs 50 and 51 similar to the lugs 35, 36. At an intermediate point between said lugs 50, 51, the plate 48 is also provided with a spring actuating lug 52 disposed between the spring extremities 44, 45 and designed to move said extremities when the head 40 is turned in different directions. Thus, should the head be turned in a clock-wise direction, as viewed in Figure 10, the spring extremity 44 will be held by the lug 46, and the extremity 45 will be moved by the lug 52 to tension the spring 43. Upon contact of the stop lug 50 with the extremity 44 any further turning movement of the head will be prevented. In a similar manner, when the head 40 is turned in a counter clock-wise direction, the lug 46 will hold stationary the extremity 45, while the lug 52 will move the extremity 44 until the stop lug 51 engages the extremity 45.

What is claimed is:

1. In a strap mounting, a stationary base plate having a spring holding member, a strap-supporting head turnable relative to said plate for movements in opposite directions from a normal position of said head, a spring actuating member on said head in normal proximity to said holding member, and a spring coiled in said head and having extremities disposed on opposite sides of said holding and actuating members and placed under tension by a turning movement of said head and actuating member in either direction relative to said holding member.

2. In a strap mounting, a stationary base plate having a spring holding member, a strap-supporting head turnable relative to said plate for movements in opposite directions from a normal position of said head, a spring actuating member on said head in normal proximity to said holding member, a spring coiled in said head and having extremities disposed on opposite sides of said holding and actuating members and placed under tension by a turning movement of said head and actuating member in either direction relative to said holding member, and stop members carried by said head on opposite sides of said holding and actuating members and each engageable with one extremity of said spring to limit a turning movement of said head.

3. In a strap mounting, a stationary base plate having a bushing centrally disposed thereon, a flanged strap-supporting head combining with said plate to form a housing through which said bushing extends, said head being turnable in opposite directions from a normal position, a spring coiled about said bushing and having its extremities projecting laterally therefrom, a spring holding member on said plate disposed between said spring extremities, a spring actuating member on the flange of said head also disposed between said extremities and engageable with either of them, depending upon the direction of turning movement of said head, to place said spring under tension, and a fastening element for said mounting extending through said bushing.

4. In a strap mounting, a stationary base plate having a bushing centrally disposed thereon, a flanged strap-supporting head combining with said plate to form a housing through which said bushing extends, said head being turnable in opposite directions from a normal position, a spring coiled about said bushing and having its extremities projecting laterally therefrom, a spring holding member on said plate disposed between said spring extremities, a spring actuating member on the flange of said head also disposed between said extremities and engageable with either of them, depending upon the direction of turning movement of said head, to place said spring under tension, stop members carried by said head on opposite sides of said holding and actuating members and each engageable with one extremity of said spring to limit a turning movement of said head, and a fastening element for said mounting extending through said bushing.

5. In a strap mounting, a stationary base plate having a bushing centrally disposed thereon, a flanged strap-supporting head combining with said plate to form a housing through which said bushing extends, said head being turnable in opposite directions from a normal position, a spring coiled about said bushing and having its extremities projecting laterally therefrom, a spring holding member on said plate disposed between said spring extremities, a spring actuating member on the flange of said head also disposed between said extremities and engageable with either of them, depending upon the direction of turning movement of said head, to place said spring under tension, stop members formed on the flange on said head on opposite sides of said holding and actuating members and each engageable with the extremity of said spring being held by said holding member to limit the turning movements of said head, and a fastening element for said mounting extending through said bushing.

6. In a strap mounting, an apertured anchoring plate having prongs adapted to be embedded in a wall of a vehicle, a stationary base plate mounted on said anchoring plate and provided with a laterally extending bushing aligned with the aperture in said anchoring plate, a flanged strap-supporting head combining with said base plate to form a housing through which said bushing extends, said bushing providing a bearing for said head about which the latter is turnable in opposite directions from a normal position, a spring coiled about said bushing and having its extremities extending toward the flange of said head, a spring holding lug projecting from said base plate and between said spring extremities, a spring actuating lug projecting from the flange of said head and also between said extremities and operable, when said head is turned in either direction to engage and move one of said spring extremities away from the other while the latter is being held stationary by said holding lug, other stop lugs formed on said flange and each engageable, depending upon the direction of turning movement of said head, with the held extremity of the spring to limit said turning movement, and a fastening element for said mounting extending through said bushing and the aperture in said anchoring plate.

7. In a strap mounting a stationary base plate, a bushing member extending therefrom, a turnable strap-supporting head cooperating with said base plate to form a housing and having a second bushing member movable with said head and having a bearing on the first named bushing member, a spring coiled about said bushing members and having its extremities extending laterally therefrom, a spring holding lug struck from said base plate and disposed between said spring extremities, another plate seated within said head and provided with a spring actuating lug also disposed between said extremities and further having stop lugs arranged on opposite sides of said actuating lug, and a fastening element for said mounting extending through said bushing members.

8. In a strap mounting, a stationary base plate, a strap-supporting head combining with said plate to form a housing and turnable relative thereto for movements in opposite directions from a normal position of said head, a spring contained within said housing, means also within said housing for tensioning said spring when said head is turned in either direction from its normal position, and means coacting with portions of said spring to limit the turning movements of said head.

9. In a strap mounting, a stationary base plate, a strap-supporting head turnable relative to said plate, a spring contained within said head and having spaced extremities, a spring holding element positioned between and engageable with said extremities to activate one of them to tension said spring when said head is turned, and means engageable with the other extremity of said spring and coacting with said holding element to limit the turning movement of said head.

10. In a strap mounting, a stationary base plate, a strap-supporting head turnable relative to said plate from a normal position, a spring within said head having spaced extremities, a holding element for said spring carried by said base plate and engaging between said extremities in the normal position of said head, and a spring actuating member on said head and also engageable between said extremities to move one relative to the other when said head is turned.

11. In a strap mounting, a stationary base plate, a strap-supporting head turnable relative to said plate from a normal position, a spring within said head having spaced extremities, a holding element for said spring carried by said base plate and engaging between said extremities in the normal position of said head, a spring actuating member on said head and also engageable between said extremities to move one relative to the other when said head is turned, and means on said head engageable with said other extremity to limit the turning movement of said head.

12. In a strap mounting, a stationary base plate, a strap-supporting head turnable from a normal position relative to said plate, a spring supported between said head and plate and activated by a turning movement of said head to restore the latter to its normal position, and means within said head and coacting with a portion of said spring to limit said turning movement.

13. In a strap mounting, a stationary base plate, a strap-supporting head turnable from a normal position relative to said plate, a spring within said head and activated by a turning movement of said head to restore the latter to its normal position, and means on said head movable into contact with said spring to limit said turning movement.

14. In a strap mounting, a stationary base plate, a strap-supporting head turnable relative to said plate in opposite directions from a normal position of the head, a spring supported between said head and plate and activated by a turning movement of said head in either direction to restore said head to normal position, and means on said head movable into contact with said spring when said head is turned to limit the turning movement thereof.

BERNARD ITZCOVITZ.
CHARLES ROSENBLUM.